Figure 1:
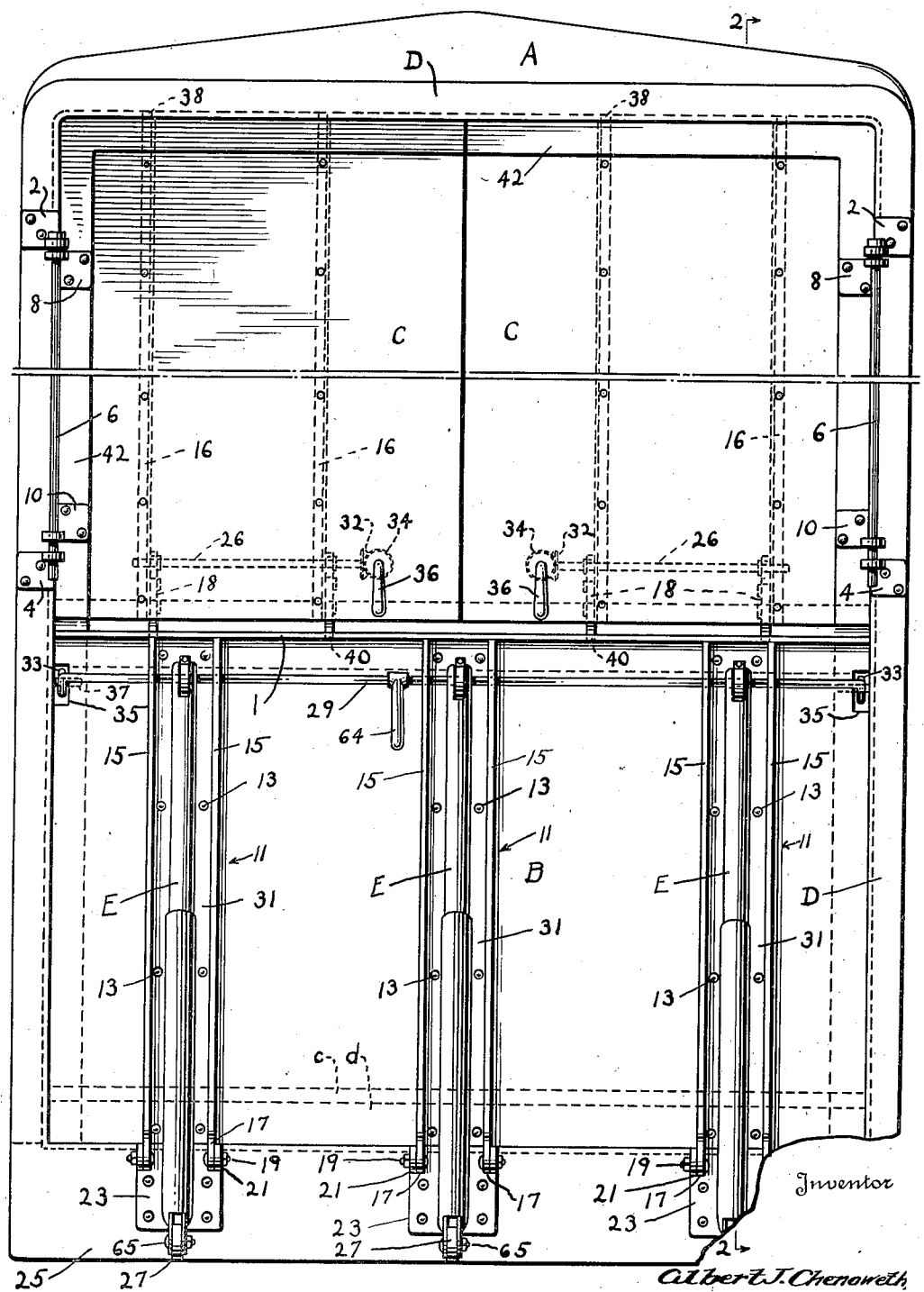

Oct. 21, 1941.  A. J. CHENOWETH  2,260,099
VAN BODY END CLOSURE
Filed Aug. 8, 1940  3 Sheets-Sheet 1

Inventor
Albert J. Chenoweth,
By Babcock & Babcock
Attorneys

Oct. 21, 1941.　　　A. J. CHENOWETH　　　2,260,099
VAN BODY END CLOSURE
Filed Aug. 8, 1940　　　3 Sheets-Sheet 2
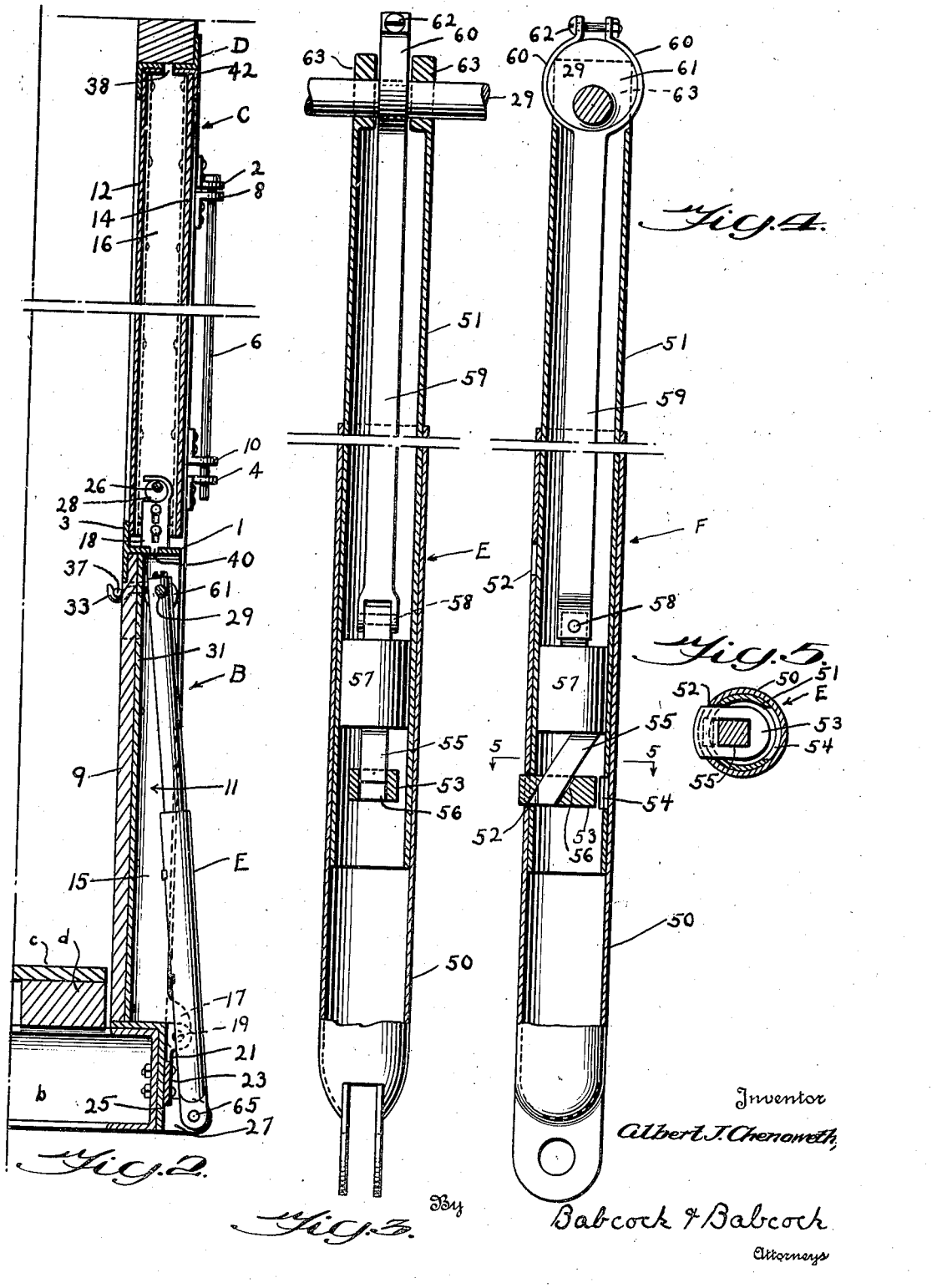

Oct. 21, 1941.  A. J. CHENOWETH  2,260,099
VAN BODY END CLOSURE
Filed Aug. 8, 1940  3 Sheets-Sheet 3
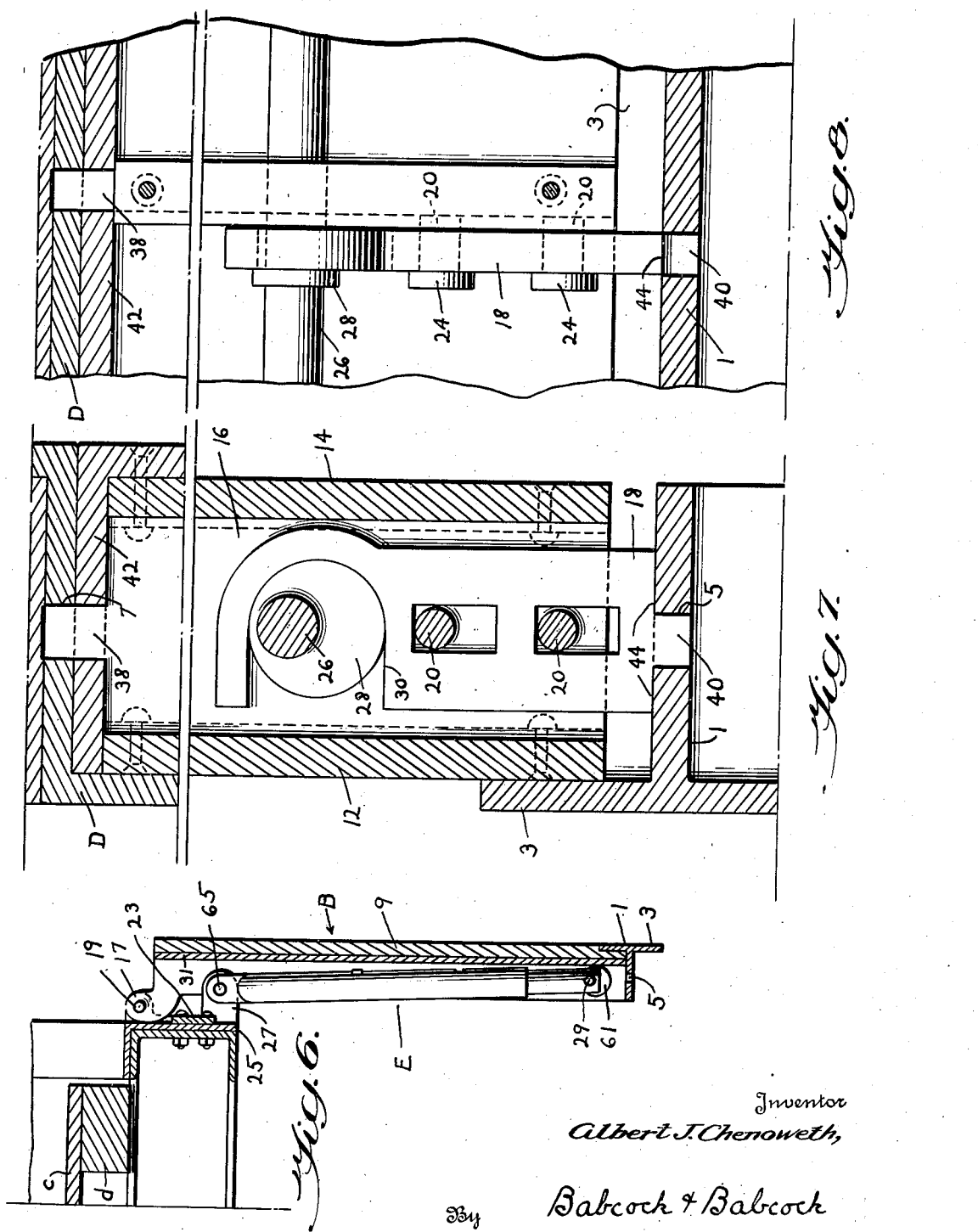
Inventor
Albert J. Chenoweth,
By Babcock & Babcock
Attorneys Patented Oct. 21, 1941

2,260,099

UNITED STATES PATENT OFFICE 2,260,099

VAN BODY END CLOSURE

Albert J. Chenoweth, Elkins, W. Va.

Application August 8, 1940, Serial No. 351,793

7 Claims. (Cl. 296—57)

This invention relates to truck or van body end closures and elements thereof, and has particular reference to such closures which comprise a lower closure member or tail gate mounted for swinging movement about a horizontal axis to close the lower portion of the body end opening, and an upper closure member or members mounted to close the upper portion of the body end opening, though the various novel features and arrangements of my broad combination may also be advantageously adapted for use in various other connections and combinations.

Truck or van bodies of rectangular cross-section are, in use, subjected to a swaying or swinging action wherein the sides of the body swing from side to side and cause the cross-sectional shape of the body to be repeatedly momentarily deformed into various non-rectangular parallelogram shapes, as when the van body is tilted from side to side in driving over rough roads or around curves. Obviously, due to the necessity for a rear end opening to permit loading and unloading of the truck, it is particularly difficult to rigidly and efficiently brace the rear end of the truck or van body against this swaying action which, needless to say, results in inevitable loosening and deterioration of the body.

The present invention has been developed with the foregoing consideration in mind and accordingly has as its broad primary object to provide a novel end closure or end gate assembly for van or truck bodies adapted to firmly rigidly brace said bodies against the aforesaid swaying action.

Other more specific objects are: to provide a novel combination of lower end gate or tail gate with a rigid extensible compression brace or support so assembled and disposed relative to said tail gate as to in inoperative or unlatched condition permit swinging movement of the tail gate through an angle of substantially 180 degrees, and operable to rigidly maintain said tail gate in various desired positions within its range of swinging movement.

Further specific objects are: to provide an upper closure member or door mounted for limited vertical movement in the end opening of the van body together with novel expanding means carried by said door for causing the same to exert vertical pressure against the top and bottom of the opening in order to brace the van body against swaying movement; and to provide in connection with such expanding means and vertically movable door, means for locking and maintaining said door in tightly closed position.

In this application I show and describe only the preferred embodiment of my invention simply by way of illustration of the practice of my invention, as by law required. However I recognize that my invention is capable of other and different embodiments, and that the various details thereof may be modified in various ways all without departing from my said invention; therefore, the drawings and description herein are to be considered as merely illustrative and not as exclusive.

In the accompanying drawings:

Figure 1 represents a rear end elevation of a van body having the preferred embodiment of my invention applied thereto;

Figure 2, a section on the line 2—2 of Figure 1, looking in the direction of the arrows;

Figure 3, an enlarged front elevation, partly in axial section, of one of the tail gate braces of my invention;

Figure 4, an enlarged side elevation, partly in axial section, of the brace illustrated in Figure 3;

Figure 5, a cross-section on the line 5—5 of Figure 4, looking in the direction of the arrows;

Figure 6, a fragmentary sectional view, corresponding to the view illustrated in Figure 2, but showing the tail gate swung to completely open position;

Figure 7, an enlarged detail fragmentary view of the upper closure member and expanding and locking means therefor; and, Figure 8, a view taken at right angles to Figure 7 and showing the portion of the invention illustrated therein.

Referring now in detail to the accompanying drawings, and having particular reference to Figures 1 and 2 thereof, the letter A designates the rear end portion of a truck or van body having the usual chassis or frame b and floor c supported at its end by a beam d extending across said chassis b.

The preferred form of van body end closure of my invention includes a lower end gate or tail gate B mounted in the end opening of the van body A for swinging movement about a horizontal axis, and a pair of upper closure members or doors C mounted in the end opening of the body A above the tail gate B for swinging movement about vertical axes, said doors C and tail gate B preferably being mounted on and carried by a rigid unitary rectangular frame D disposed in the end opening of body A so that my entire assembly and combination of closure members B and C may be manufactured and assembled as a unit in frame D to be thereafter applied to either new or old van bodies.

The upper closure members or doors C of my invention are arranged in symmetrical relation to close the upper portion of the truck or van body end opening above the tail gate B and are identical except that they are arranged to be mounted and operated on opposite sides of the frame D and accordingly the positions of various of the parts thereof are reversed.

Each said door C is swingably mounted on frame D in such manner as to permit a small amount of vertical movement thereof, and is of somewhat smaller vertical dimensions than the portion of the opening which it is adapted to close, so that it is free to have a limited amount of vertical movement between the top of the frame D and the upper edge of tail gate B.

Although it is conceivable that the doors C may be vertically movably, swingably mounted, in various ways, all within the scope of my invention, the preferred mounting means for each of said doors C, illustrated in Figures 1 and 2, consists of upper and lower frame hinge members 2 and 4 respectively secured to frame D and pivotally connected by means of a vertical pintle 6 to door hinge members 8 and 10 secured to the adjacent edge reinforcing beading 42 of the door C, the hinge members 8 and 10 of the door being spaced closer together than the cooperating members 2 and 4 of the frame D and disposed therebetween so as to permit vertical movement of said door hinge members 8 and 10 on the pintle 6.

In conjunction with each door C I provide novel expanding or pressure exerting means carried thereby for exerting a substantial amount of pressure against one of the vertical marginal boundaries or edge portions of the opening in which said door C is disposed, so as to move the door vertically into tight pressing engagement with the opposed vertical edge of said opening, thereby rigidly and efficiently reinforcing the truck body against swaying motion as hereinbefore mentioned. A further novel feature resides in the provision of locking means at the opposed vertical edges of said doors C to, during the expanding action of said pressure exerting means, be received in recesses in the opposed upper and lower edges of the opening in which the door is disposed in order to lock said door in closed position when desired.

In order to embody the aforementioned features in the doors C in an attractive as well as efficient manner, I prefer to construct each said door C of two relatively spaced panel members 12 and 14 which are secured together and maintained in spaced assembled relationship by means of vertical reinforcing beams or channel irons 16 interposed between and secured to panels 12 and 14.

With such a construction of door C, the pressure exerting or expanding means of my invention may be mounted on and carried by the beams 16 interiorly of the doors C so as to be concealed from view and protected from the elements, the preferred form of such means consisting of vertically movable thrust members or feet 18 respectively vertically movably mounted at the lower end portions of said beams 16 for movement downward through the bottom edge of the door into operative engagement with the adjacent upper edge or edge beading 1 of the tail gate B. In the preferred embodiment of the invention illustrated, the feet or thrust members 18 are vertically slidably secured to their respective beams 16 by means of bolts or rivets 20 secured to said beams and passing through vertical slots or grooves 22 in said thrust members 18 so that said members are guided in their vertical movement between the bolt heads 24 and the adjacent surfaces of their respective beams 16, all as illustrated in detail in Figures 7 and 8.

The preferred actuating means for producing vertical movement of said thrust members 18 in each door C consists of a horizontally disposed cam shaft 26 journalled through the beams or channel irons 16 interiorly of the door and having cams or eccentrics 28 keyed thereto in operative engagement in recesses 30 formed in the upper end portions of said thrust members 18, whereby partial rotation of said cam shaft 26 and cams 28 produces vertical movement of said thrust members 18. Keyed to the inner end of each said cam shaft 26 is a bevel gear 32 disposed in mesh with a similar bevel gear 34 carried by and keyed to the stem of a crank or operating handle 36, the stem of said handle being journalled for rotation through the outer panel 14 of its respective door C, and the gripping portion of said crank or handle 36 being disposed on the outside of said panel to be easily grasped and operated.

The upper edge beading 1 of the tail gate B is preferably of T-shaped cross section, as illustrated in Figure 2, so that a portion 3 of said beading extends vertically upward above the lower edge of doors C and lies flush against the inner surfaces thereof to act as a stop or positioning means for said doors in their closed position, and also to close or seal the space or aperture between the lower edges of doors C and the upper edge of tail gate B when the upper doors C are raised into tight locking bracing engagement with the top of frame D by the action of thrust members or feet 18, as illustrated.

Also said beading 1, and the upper horizontal portion of frame D are each formed with recesses 5 and 7 respectively disposed to receive locking tongues 38 and 40 projecting respectively from the upper edges of said doors C and the lowermost operative surfaces or edges of said thrust members 18, for the purpose of locking and maintaining said doors C in closed position. If desired, the locking tongues 38 at the upper edges of the doors may be formed integral with the upper ends of the beams 16 so as to project through and above the reinforcing angular cross-section edge beadings 42 extending around the upper edge and the hinged side of each door C.

In the operation of the upper doors C of my end closure assembly, after the van has been loaded, the tail gate B is first swung upwardly and locked in closed position in the manner hereinafter set forth. Thereafter, the upper doors C are each swung to closed position, and the operating handles 36 are turned to cause downward movement of the thrust members 18 into operative engagement with the end gate upper beading 1 wherein the locking tongues 40 will first be seated in their respective locking recesses 5 in said beading 1 and the lower horizontal edge portions 44 of said thrust members 18 on either side of the locking tongues 40 will then seat upon the upper horizontal surface of the beading 1, and thereafter continued turning of the operating handles 36 producing further downward movement of the members 18 relative to their respective doors C will force said doors C upwardly so that their upwardly projecting locking tongues 38 are respectively received in their cooperating locking recesses 7 in the upper portion of frame D, and the upper edges of doors C are forced into tight engagement against the upper transversely extending portion of said frame D, all as clearly illustrated in Figures 1 and 2. In order to unlock said doors C the operating handles 36 thereof are turned so as to retract or produce upward movement of the thrust members or feet 18 relative to their respective doors, thereby permitting disengagement of the locking tongues 40 of said members 18 and permitting the doors C to move downwardly and thereby removing the upper locking tongues or members 38 from operative locking engagement in their respective cooperating recesses 7 in the upper part of frame D. After the door C has thus moved downwardly into unlocked position and out of its operative vertically thrusting relationship in frame D it may of course be easily swung open in the usual manner.

So far as my broad combination of upper doors C with the tail gate B is concerned it is sufficient for the purposes of said combination that any form of tail gate or member be employed so long as the same is disposed beneath the upper doors C and is formed with a suitable upper edge having locking means 5 therein to cooperate with the thrust members 18 and locking tongues 40 of the doors C in the manner described.

However I prefer to use in such combination a novel form of tail gate B and bracing and locking means therefore.

Accordingly, the improved tail gate arrangement of my invention comprises a rigid panel or sheet metal member 9 having preferably a plurality of rigid bracing and reinforcing U-shaped cross-section channel irons 11 secured thereto by suitable means usch as bolts 13, the spaced parallel sides or flanges 15 of said channel irons 11 extending below the lower edge of the panel 9 to form hinge members 17 which are pivotally secured or connected, as by bolts 19, to ears or hinge members 21 preferably integral with a bracket 23 mounted on a downwardly depending flange 25 bolted to chassis b and preferably constituting a portion of frame C.

It is to be noted of course that the beams or members 11 and the panel 9 secured thereto are disposed for swinging movement about the axis of hinge bolts 19, which of course are disposed in axial alignment with each other.

Formed on each of the brackets 23 a substantial distance below the hinge members 21 thereof, is a lug or integral ear or projection 27 to which is pivotally connected, by means such as the pin or pivot 65, one end of a rigid extensible brace designated E in its entirety, the other end of said brace E being pivotally connected to its respective channel iron adjacent the upper edge of the tail gate B by suitable means such as the horizontally disposed eccentric shaft 29 journalled through said upper end and the opposed parallel sides 15 of each said channel iron 11.

Preferably one such extensible brace E is utilized in connection with each channel iron 11, though obviously this is not essential, and any form of rigidly extensible brace adjustable to various lengths may be used. However I prefer to use the new and highly useful brace or compression member of my invention which is illustrated in the accompanying drawings.

Referring now in detail to Figures 3, 4 and 5 which clearly illustrate this rigid extensible brace E of my invention, it may be seen that each said brace E comprises a pair of rigid telescopically arranged tubular members 50 and 51, the outer member 50 being provided with a suitable number of slots or apertures 52 through which may be disposed a latch 53 carried by the inner tube or member 51, and guided and axially positioned therein by diametrically opposed transverse slots 54, to lock the tubes 50 and 51 in various positions of adjustment against relative longitudinal movement, it being noted of course that the latch 53 is movable in a transverse direction outwardly through one of the slots 54 of inner member 1.

Movement of latch 53 outwardly through slot 54 into locking engagement in either of the longitudinally spaced apertures 52 of the outer member 50, or retraction thereof into inoperative position, may be produced by means comprising a translation cam or diagonal bar 55 slidably disposed through a diagonal passageway 56 in said latch 53, the translation cam 55 being carried by a piston 57 disposed for reciprocation in said inner tubular member. The piston 57 is pivotally connected by suitable means such as the pin 58 to one end of a pitman or connecting rod 59, the other end of said pitman being in the form of a journal having substantially semicircular furcations 60 secured together and journalled about an eccentric 61, fixedly mounted on the eccentric shaft 29, by suitable means such as the bolt 62.

As illustrated, the pivoted end of the inner tubular member 51 of the brace E is formed with laterally spaced bearing members 63 which are rotatably journalled on the eccentric shaft 29, and the eccentric 61 is, in each case, preferably disposed between said bearing members or journals 63 and secured to the shaft 29 for rotation therewith.

In my assembled tail gate, the eccentric shaft 29 is common to all the extensible braces E thereof and consequently serves to simultaneously actuate the latches 53 of all of the braces E when partially rotated by turning the operating handle 64 thereof.

It is to be noted that the three pivot pins or pivots 29, 19 and 65 of each channel iron 11 and its cooperating brace E are in the closed position of the tail gate disposed out of vertical alignment in such manner that any force tending to swing open the tail gate B places the braces E under compression.

In order to retract or release the latches 53 of the respective braces E from operative position into inoperative position to permit the tail gate to be swung towards open position, the operating handle 64 of eccentric shaft 29 is turned upwardly to rotate the eccentrics 61 through substantially a hundred and eighty degrees from the position shown in Figure 4, thus shoving the pistons 57 and translation cams 55 downwardly through the passageways 56 in latches 53 and thereby retracting said latches into inoperative position within their respective tubular members 51.

The outer tubular members 50 may of course be provided with any desired number of positioning or locking apertures 52 to permit the tail gate B to be retained in any of a number of predetermined positions.

In the embodiment of the invention illustrated there are provided two such apertures or perforations on each outer tubular member 50, the uppermost of said perforations 52 being so positioned that the latch 53 when disposed therein, as shown in Figure 2, will lock the tail gate in completely closed position, and the lowermost of said perforations being so disposed that the tail gate B may be maintained in a horizontal position so as to constitute a horizontal continuation of the floor c of the van.

It is to be particularly noted that with the construction and arrangement of tail gate B and positioning means therefor of my invention the tail gate B may be swung through an arc of one hundred and eighty degrees more or less, and accordingly may be allowed to hang vertically downwardly, as shown in Figure 6, this being desirable where it is wished to back the van up close to a loading platform, etc., in order to load or unload the same.

Such a wide range of swinging movement of the tail gate B is possible by virtue of the novel arrangement of the channeled members 11, the hinged portions or members 17 of which are, in closed position of the gate, spaced rearwardly away from the backs 31 of said channelled members 11, so that when swung to the extreme open position shown in Figure 6, the backs 31 of said members 11 swing clear of the pivotal connections 19 of the members 11, and said connections 19 are received between the opposed side walls 15 of said members 11.

If desired, the eccentric shaft 29 may be provided with auxiliary fastening means such as the hooks 33 formed at opposite ends thereof to be swung through apertures 35 on opposite sides of the tail gate into locking engagement about pins 37 projecting horizontally inwardly from the sides of the frame D. Said hooks 33 are of course so disposed on the shaft that they engage and disengage the pins 37 as the latches 53 are moved into and out of locking position by rotation of the shaft 29.

I claim:

1. A tail gate arrangement for vehicles comprising a relatively stationary frame member, a channel iron hinged at its lower end to said frame member for swinging motion about a horizontal axis, a transversely disposed eccentric shaft journalled for rotation through the side walls of said channel iron at the upper end thereof, a rigidly extensible telescoping brace comprising an inner tubular member pivotally secured to said shaft, and an outer tubular member pivotally attached to said frame member and telescopically receiving the end portion of said inner tubular member, said brace being received between the side flanges of said channel iron, in combination with a latch disposed for transverse movement through the side wall of said inner member into locking engagement with said outer member and formed with a guide slot extending diagonally therethrough, a piston mounted for axial reciprocation in said inner tubular member, a translation cam carried by said piston and disposed through the guide slot of said latch to cause transverse movement of said latch during reciprocation of said piston, and means for reciprocating said piston comprising an eccentric fixedly mounted on said eccentric shaft, a pitman having one end journalled about said eccentric and the other end pivotally connected to said piston.

2. A tail gate arrangement for vehicles comprising a relatively stationary frame member, a channel iron hinged to said frame member, an eccentric shaft journalled transversely through said channel iron, a rigidly extensible telescoping brace comprising an inner tubular member journalled at one end about said shaft, and an outer tubular member pivotally attached at one end to said frame member, the free end portion of the inner member being telescopically slidably disposed within the cooperating free end portion of the outer tubular member, in combination with a latch disposed for transverse movement through the side wall of said inner member into locking engagement with said outer member, said latch being formed with a diagonal guide slot, a piston mounted for reciprocation in said inner tubular member, a translation cam carried by said piston and disposed through the guide slot of said latch to cause transverse movement of said latch during reciprocation of said piston, and reciprocating means for said piston comprising an eccentric fixedly mounted on said eccentric shaft, and a pitman having one end journalled about said eccentric and the other end pivotally connected to said piston, whereby said piston is caused to reciprocate during rotation of said eccentric and eccentric shaft.

3. A tail gate comprising a frame member, a channel iron hinged to said frame member, an eccentric shaft journalled through said channel iron, a rigid telescoping brace comprising an inner tubular member journalled at one end about said shaft, and an outer tubular member pivotally attached at one end to said frame member, the free end portion of the inner member being telescopically slidably disposed within the cooperating free end portion of the outer member, in combination with a latch disposed for transverse movement through the side wall of said inner member into locking engagement with said outer member, said latch being formed with a diagonal guide slot, a piston mounted for reciprocation in said inner member, a cam member carried by said piston and disposed through said guide slot of the latch to cause transverse movement thereof during reciprocation of said piston, and reciprocating means for said piston comprising an eccentric fixedly mounted on said eccentric shaft for rotation therewith, and means operatively connecting said piston and eccentric to cause reciprocation of said piston during rotation of said eccentric.

4. A telescoping rigid compression brace comprising an outer tubular member, and an inner tubular member having one end portion telescopically axially slidably disposed within said outer member, in combination with means for adjusting and maintaining the length of said brace comprising a latch disposed within said inner member for axially transverse movement outward through the side thereof into locking engagement with said outer tubular member, said latch being formed with a diagonal guide slot extending therethrough, a plunger disposed for axial reciprocation in said inner member, a translation cam carried by said plunger and slidably disposed through the guide slot of said latch to cause transverse movement thereof during reciprocation of said plunger in either direction, an eccentric shaft transversely rotatably journalled across the outwardly projecting end of said tubular member, an eccentric mounted on said shaft for rotation therewith, and means operatively connecting said plunger and eccentric to cause reciprocation of said plunger during rotation of said eccentric.

5. An adjustable length rigid compression brace comprising an outer tubular member, and an inner tubular member having one end portion slidably disposed within said outer member, in combination with a latch disposed within said tubular member for movement outward through the side thereof into locking engagement with said outer tubular member, a plunger disposed for reciprocation in said inner member, cam means carried by said plunger in operative engagement with said latch to during reciprocation of said plunger cause actuation of said latch, a transversely disposed shaft rotatably journalled at the outwardly projecting end of said inner member, an eccentric mounted on said shaft for rotation therewith, and means operatively connecting said plunger and eccentric whereby said plunger will be caused to reciprocate by rotation of said eccentric.

6. An adjustable length rigid compression brace comprising an outer tubular member, and an inner tubular member having one end portion slidably received within said outer member, in combination with a latch disposed within said tubular member for movement through the side wall thereof into locking engagement with said outer tubular member, a plunger disposed for reciprocation in said inner tubular member, cam means carried by said plunger in operative engagement with said latch to during reciprocation of said plunger cause actuation of said latch, and means for reciprocating said plunger.

7. An adjustable length rigid compression brace comprising an outer tubular member, and an inner member slidably disposed in said outer member, in combination with a latch carried by said inner member for movement into and out of locking engagement with said outer member, a plunger carried by said inner member for reciprocation relative thereto, and means carried by said plunger in operative engagement with said latch to cause movement thereof into and out of engagement with said outer member.

ALBERT J. CHENOWETH.